(12) United States Patent
Karlsson

(10) Patent No.: US 10,115,162 B1
(45) Date of Patent: Oct. 30, 2018

(54) METHOD AND SYSTEM OF A TARGET RESULT OPTIMIZING APPLICATION

(71) Applicant: Pentech Limited, Ta' Xbiex (MT)

(72) Inventor: Bror Frederik Karlsson, Ta' Xbiex (MT)

(73) Assignee: PENTECH LIMITED, Ta'Xbiex (MT)

( * ) Notice: Subject to any disclaimer, the term of this patent is extended or adjusted under 35 U.S.C. 154(b) by 0 days.

(21) Appl. No.: 15/591,162

(22) Filed: May 10, 2017

Related U.S. Application Data

(60) Provisional application No. 62/382,068, filed on Aug. 31, 2016.

(51) Int. Cl.
  *G06Q 40/06* (2012.01)
  *G06Q 40/04* (2012.01)
  *G06F 3/048* (2013.01)
  *G06F 17/50* (2006.01)

(52) U.S. Cl.
  CPC ............ *G06Q 40/06* (2013.01); *G06F 3/048* (2013.01); *G06F 17/5009* (2013.01); *G06Q 40/04* (2013.01)

(58) Field of Classification Search
  None
  See application file for complete search history.

(56) References Cited

U.S. PATENT DOCUMENTS

| | | | | |
|---|---|---|---|---|
| 5,884,287 A | * | 3/1999 | Edesess | G06Q 40/06 705/36 R |
| 8,768,800 B2 | * | 7/2014 | Milosavljevic | G06Q 40/00 705/35 |
| 8,818,758 B1 | * | 8/2014 | Singh | G06F 21/81 702/182 |
| 2002/0138386 A1 | * | 9/2002 | Maggioncalda | G06Q 40/00 705/36 R |
| 2012/0158612 A1 | * | 6/2012 | Robertson | G06Q 40/06 705/36 R |
| 2013/0198111 A1 | * | 8/2013 | DiCastri | G06Q 40/06 705/36 R |
| 2015/0127387 A1 | * | 5/2015 | Atwell | G06Q 40/08 705/4 |
| 2015/0161734 A1 | * | 6/2015 | Shimpi | G06Q 40/06 705/36 R |
| 2015/0228026 A1 | * | 8/2015 | Michael | G06Q 40/06 705/36 R |

* cited by examiner

*Primary Examiner* — Olabode Akintola
(74) *Attorney, Agent, or Firm* — McInnes & McLane, LLP

(57) ABSTRACT

A system of optimizing a target result receives, by a client input server, a target result from a user, where the target result comprises at least one of a goal, and a statistical probability that the target result is achievable, and where the target result is to be achieved during a time period. The system compiles, by an output server, an interactive strategy comprising a timeline to achieve the target result. The system optimizes at least a portion of the interactive strategy by modeling at least one future performance model associated with the target result, and determining an optimal strategy for the target result comprising a target result value. The system renders the optimized interactive strategy, the statistical probability, and the target result for the user on a real-time interactive display, where the statistical probability is predictive of achieving the target results.

33 Claims, 15 Drawing Sheets pentech

Input parameters

Currency: EUR
Start year: 2020
Stop year: 2100
Withdrawal start year: 2060
Annual deposit: 3600
Initial investment: 2000
Stop time asset value: 0
Chance of reaching target %: 70
Bond start %: 0
Bond stop %: 70
Annual withdrawal: 13000
Stock index %: auto-obtain
Bond index %: auto-obtain
Inflation %: auto-obtain
Transaction cost %: 0.0
Inflation adjusted input: ☐
Inflation adjusted output: ☐
Optimize strategy: ☐
Additional withdrawals:

| Year | Withdrawal |
|------|------------|
|      | €          |

Run simulation   Create predictive matrix

FIG. 2

Interactive simulation

I am 30 years old and I wish to deposit € 300 monthly for my pension. I will invest € 2000 initially I wish to retire when I turn 65 and use my funds the following 30 years.

I aim for a 70 % chance of reaching my target pension.

I also want the following withdrawals:

| Age | Withdrawal |
|---|---|
| 50 | € 2000 |
|  | € |

If you follow this plan, there is a 70% chance your monthly pension will be at least €1388. For an additional €78 monthly, you will have an 85% chance to reach the goal.

I wish to aim for a € 1388 monthly pension.

FIG. 4

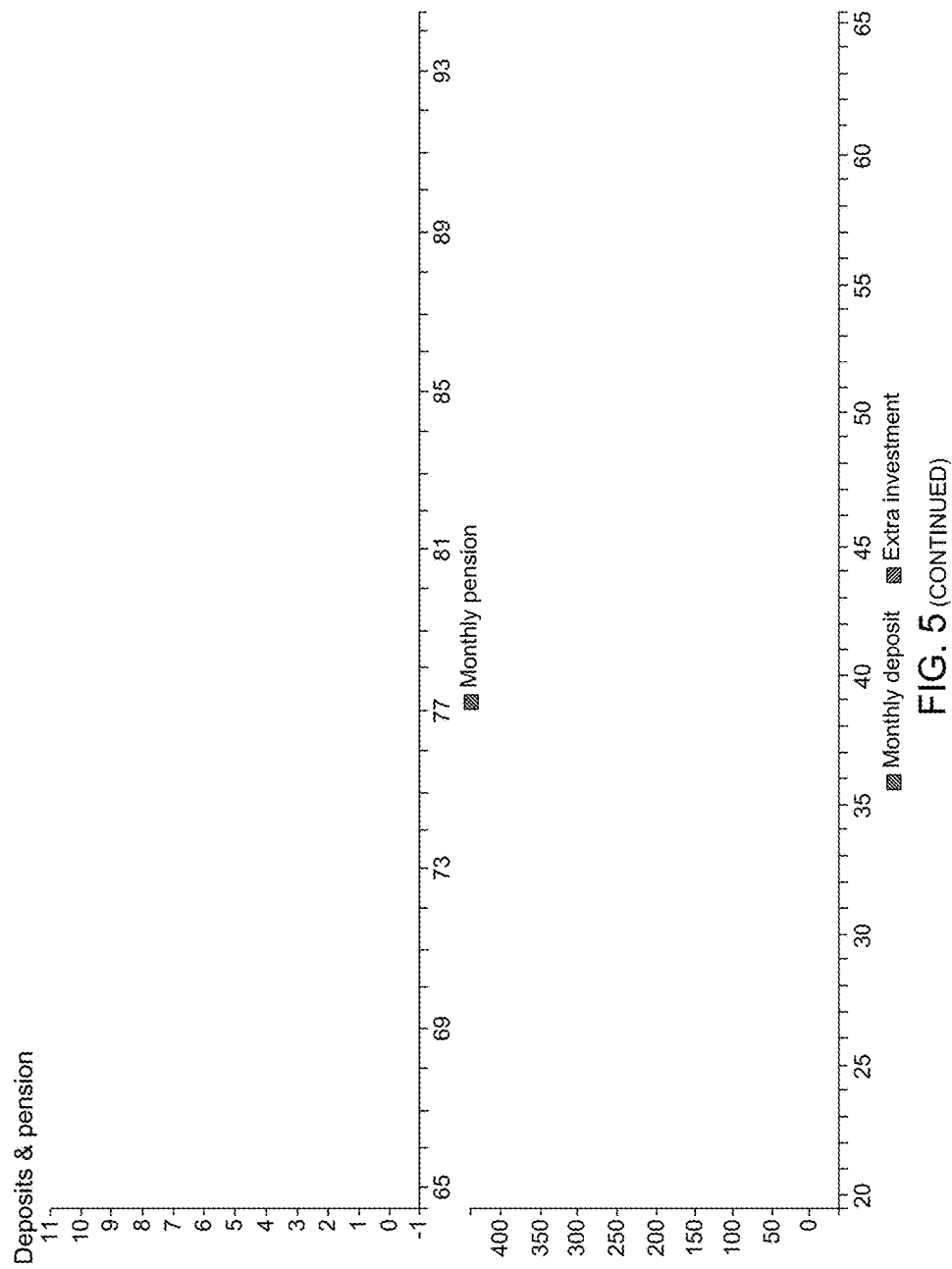

Forecast at age 20

Calculate forecast

Pension age

Age Deposit
60   401
61   375
62   355
63   334
64   315
65   296
66   279
67   262
68   246
69   232
70   218

METHOD AND SYSTEM OF A TARGET RESULT OPTIMIZING APPLICATION

CROSS-REFERENCE TO RELATED APPLICATIONS

This application claims the benefit of priority to U.S. Provisional Patent Application No. 62/382,068, filed Aug. 31, 2016 and entitled "Method and System of a Liquidity Profiling Application," the entire contents of the application being incorporated herein by reference in its entirety.

BACKGROUND

When striving to achieve a target result over the course of a time period, such as an investment goal over an investment period, it is often necessary to determine the amount of assets to devote toward the target result, and how to allocate those assets over the course of the time period. Therefore, it would be helpful to have a way to automatically optimize the allocation of assets over the course of the time period to attain the highest probability of achieving the target result.

SUMMARY

According to one embodiment disclosed herein, in a method for optimizing a target result, a client input server receives a target result from a user via a real-time interactive display. The target result comprises at least one of a goal, and a statistical probability that the target result is achievable. The target result is to be achieved during a time period beginning at a target result start point, and ending at a target result end point. The target result is transmitted from the real-time interactive display to the client input server. An output server compiles an interactive strategy to achieve the target result, where the interactive strategy comprises a timeline starting at the target result start point, and ending at the target result end point. The client input server transmits the target result to the output server. An optimizer application with an optimizer interface that interfaces with at least one of a client input interface of the client input server and an output interface of the output server optimizes at least a portion of the interactive strategy. The portion of the interactive strategy is optimized by i) modeling, by a model generator, at least one future performance model associated with the target result, where the optimizer application obtains the future performance model from the model generator, and ii) determining an optimal strategy for the target result at the target result end point, where the optimal strategy comprises a target result value. The method renders the optimized interactive strategy, the statistical probability, and the target result for the user on the real-time interactive display, where the statistical probability is predictive of achieving the target results. The optimized interactive strategy is transmitted from the output server to the client input server to be rendered on the real-time interactive display. After determining the optimal strategy, the method determines at least one second optimal strategy for the target result at a first location in the timeline between the target result end point and the target result start point, using the future performance model. The future performance model provides a performance indicator for the target result at the first location to achieve a sub target result value at the target result end point.

In one aspect of embodiments disclosed herein, the method receives an invocation from the user, via the real-time interactive display, to activate the optimized interactive strategy. The method simulates the optimized interactive strategy over the course of the time period, on the real-time interactive display, where the simulated optimized interactive strategy renders at least one second optimal strategy and the optimal strategy, starting at the target result start point and ending at the target result end point.

In one aspect of embodiments disclosed herein, when the method simulates the optimized interactive strategy over the course of the time period, the method determines a plurality of optimized interactive strategies, and randomly selects one of the plurality of optimized interactive strategies to present to the user on the real-time interactive display.

In one aspect of embodiments disclosed herein, when the method simulates the optimized interactive strategy over the course of the time period, the method incorporates data streamed from a real time online database into at least one of the simulated optimized interactive strategy and a future simulated optimized interactive strategy.

In one aspect of embodiments disclosed herein, when the method simulates the optimized interactive strategy over the course of the time period, the method determines, during the rendering, that the target result is not achievable. The method then iteratively adjusts at least one of a plurality of inputs associated with the target result, and simulates the optimized interactive strategy until the target result is achieved.

In one aspect of embodiments disclosed herein, when the method simulates the optimized interactive strategy over the course of the time period, the method determines, during the rendering, that the target result is achievable. The method then iteratively adjusts at least one of a plurality of inputs associated with the target result and simulates the optimized interactive strategy until the target result is within an acceptable target result range.

In one aspect of embodiments disclosed herein, when the method simulates the optimized interactive strategy over the course of the time period, the method determines, during the simulating, that the target result is not achievable. The method then determines a highest suboptimal target result that is achievable and a highest statistical probability that the highest suboptimal target result is achievable. The method automatically modifies at least one of a plurality of inputs and/or prompts the user to change at least one of the plurality of inputs. The method then re-simulates the optimized interactive strategy over the course of the time period.

In one aspect of embodiments disclosed herein, the method provides the user with at least one interactive control to interact with the simulated optimized interactive strategy during the simulation, via the real-time interactive display. The method obtains at least one sub target result from the user during the simulation of the optimized interactive strategy. The method renders the simulated optimized interactive strategy with at least one sub target result incorporated into the optimized interactive strategy. The method obtains at least one sub target result from the user via the real-time interactive display, where at least one sub target result occurs between the target result start point and the target result end point. The method incorporates at least one sub target result into the optimized interactive strategy. The sub target result comprises adding a first asset and/or removing a second asset.

In one aspect of embodiments disclosed herein, when the method incorporates at least one sub target result into the optimized strategy, the method provides the user with at least one interactive control to incorporate at least one sub target result into the simulated optimized interactive strategy.

In one aspect of embodiments disclosed herein, when the client input server receives the target result from the user via the real-time interactive display, the method automatically interfaces with an online account associated with the user to transmit, from the online account to the client input server, input relevant to the target result. The automatic interfacing comprises automatically logging into the online account.

In one aspect of embodiments disclosed herein, when the client input server receives the target result from the user via the real-time interactive display, the method receives the goal from the user. When the optimizer application optimizes at least a portion of the interactive strategy, the method determines the statistical probability based on the goal inputted by the user.

In one aspect of embodiments disclosed herein, when the client input server receives the target result from the user via the real-time interactive display, the method receives the statistical probability from the user. When the optimizer application optimizes at least a portion of the interactive strategy, the method determines the goal based on the statistical probability inputted by the user.

In one aspect of embodiments disclosed herein, when the optimizer application optimizes at least a portion of the interactive strategy, the method automatically modifies at least one of a plurality of inputs, and/or prompts the user to change at least one of the plurality of inputs. The method then re-optimizes at least a portion of the interactive strategy. The plurality of inputs comprise at least one of an investment period, an annuity drawing period, an initial investment, an investment maximum, a target annuity, and/or a periodic deposit.

In one aspect of embodiments disclosed herein, the model generator models the future performance model comprising resources used to achieve the target result, and an allocation of each of the resources in the future performance model.

In one aspect of embodiments disclosed herein, when the model generator models the future performance model comprising resources used to achieve the target result, and an allocation of each of the resources, the model generator determines the allocation of each of the resources at any point during the time period to attain a highest probability of achieving the target result. The method then provides a recommendation to redistribute the allocation of each of the resources to achieve the target result.

In one aspect of embodiments disclosed herein, the model generator models the future performance model using data streamed from a real time online database.

In one aspect of embodiments disclosed herein, when the model generator models the future performance model, the method calculates a probability distribution function for the target result at the target result end point.

In one aspect of embodiments disclosed herein, when the method calculates a probability distribution function for the target result at the target result end point, the method selects the distribution function target result value from at least two distribution functions based on a risk profile specified by the user in the real-time interactive display.

In one aspect of embodiments disclosed herein, the model generator models the future performance model using an example of a past performance.

In one aspect of embodiments disclosed herein, when the method determines at least one second optimal strategy, the method iteratively determines at least one third optimal strategy for the target result, at a plurality of intervals in the timeline between the first location in the timeline and the target result start point, using the future performance model. The future performance model provides a performance indicator, at each of the plurality of intervals, to achieve the target result value at the target result end point.

In one aspect of embodiments disclosed herein, when the method iteratively determines at least one third optimal strategy for the target result, the method utilizes a Monte Carlo simulation to calculate the target result value at the target result end point.

In one aspect of embodiments disclosed herein, when the method iteratively determines at least one third optimal strategy for the target results, the method incorporates a previous interval target result value when determining the third optimal strategy for the target result at a current interval. The previous interval target result value is an estimated target result value calculated at a previous interval, and the current interval is closer to the target result start point than the previous interval.

In one aspect of embodiments disclosed herein, when the method renders the optimized interactive strategy, the method renders the optimized interactive strategy real-time as the optimized interactive strategy is generated, and/or renders a previously generated optimized interactive strategy that is displayed when a user invokes the rendering of the optimized interactive strategy.

In one aspect of embodiments disclosed herein, when the method renders the optimized interactive strategy, the method provides the user with a recommendation to achieve the target result.

System and computer program products corresponding to the above-summarized methods are also described and claimed herein.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

Various aspects of at least one embodiment are discussed below with reference to the accompanying figures, which are not necessarily drawn to scale, emphasis instead being placed upon illustrating the principles disclosed herein. The figures are included to provide an illustration and a further understanding of the various aspects and embodiments, and are incorporated in and constitute a part of this specification, but are not intended as a definition of the limits of any particular embodiment. The figures, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure.

FIG. 2 illustrates an example user input screen for a target result optimizing application, according to embodiments disclosed herein.

FIG. 4 illustrates an example interactive simulation input screen in the target result optimizing application, according to embodiments disclosed herein.

FIG. 9 is an example forecast calculated by the target result optimizing application, according to embodiments disclosed herein.

FIG. 10 is an example trading activity table created by the target result optimizing application, according to embodiments disclosed herein.

DETAILED DESCRIPTION

Figure 1:
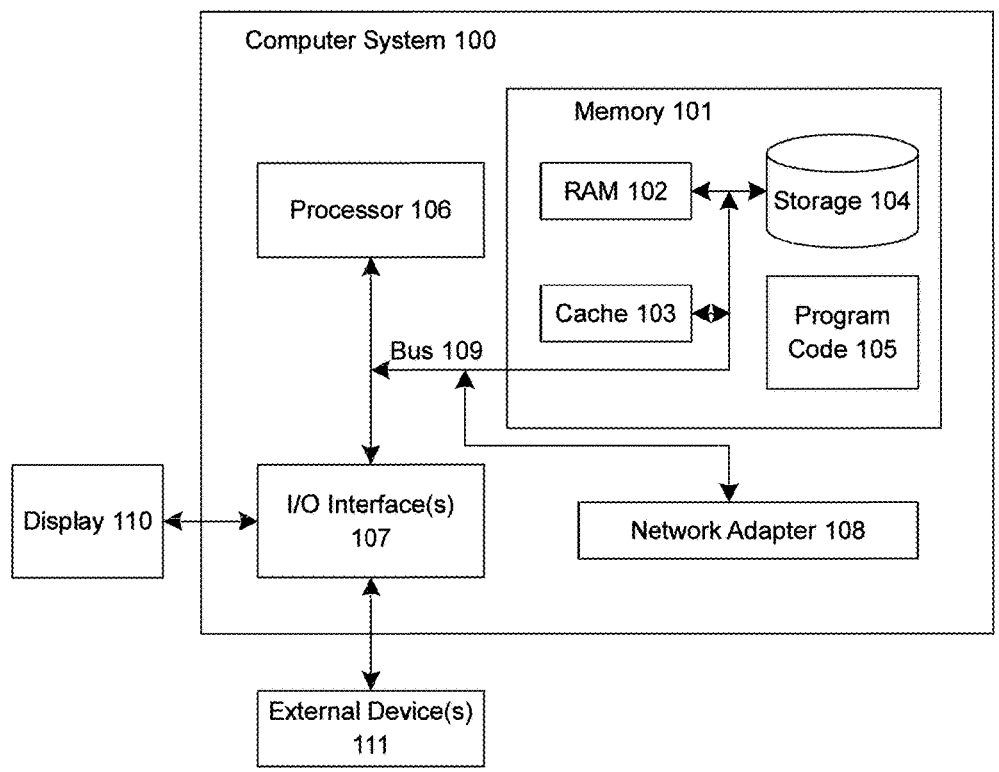
FIG. 1 illustrates a system for optimizing a target result according to embodiments disclosed herein.
Figure 3:
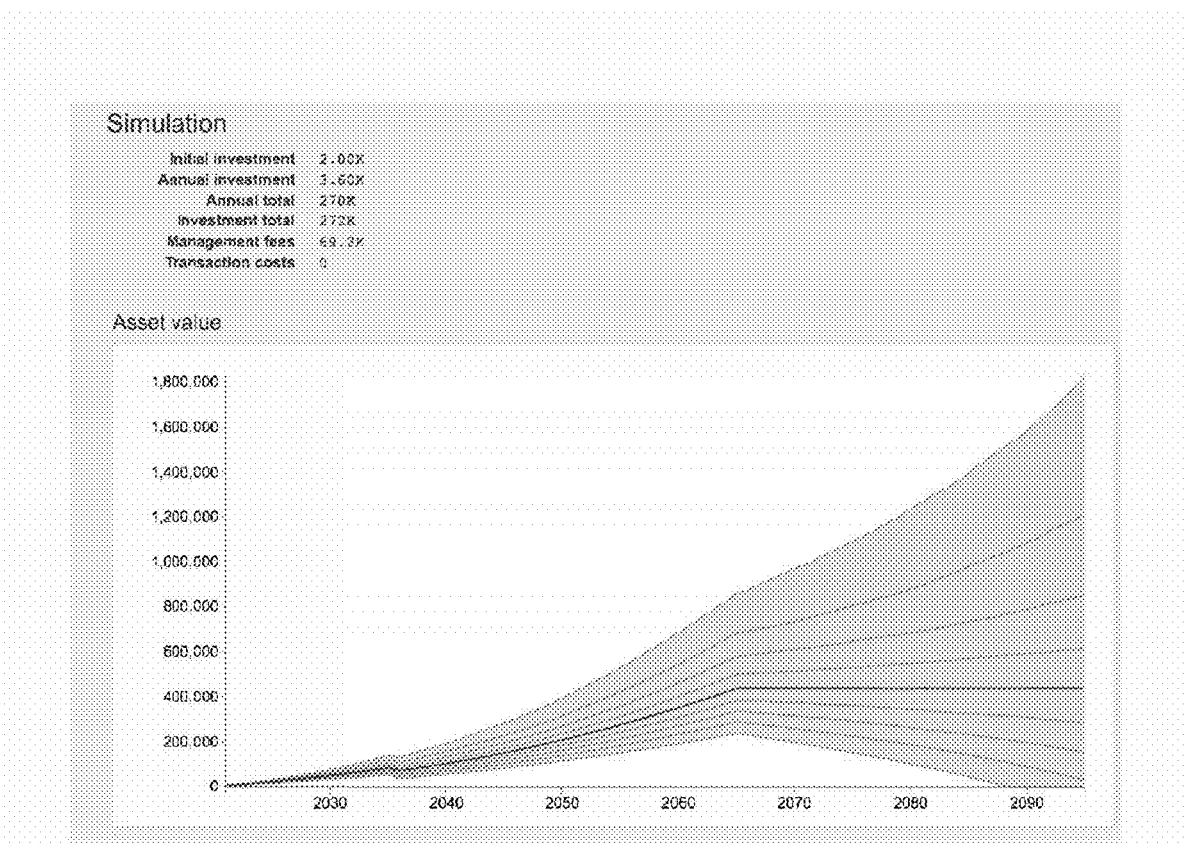
FIG. 3 illustrates an example asset value table created by the target result optimizing application, according to embodiments disclosed herein.
Figure 5:
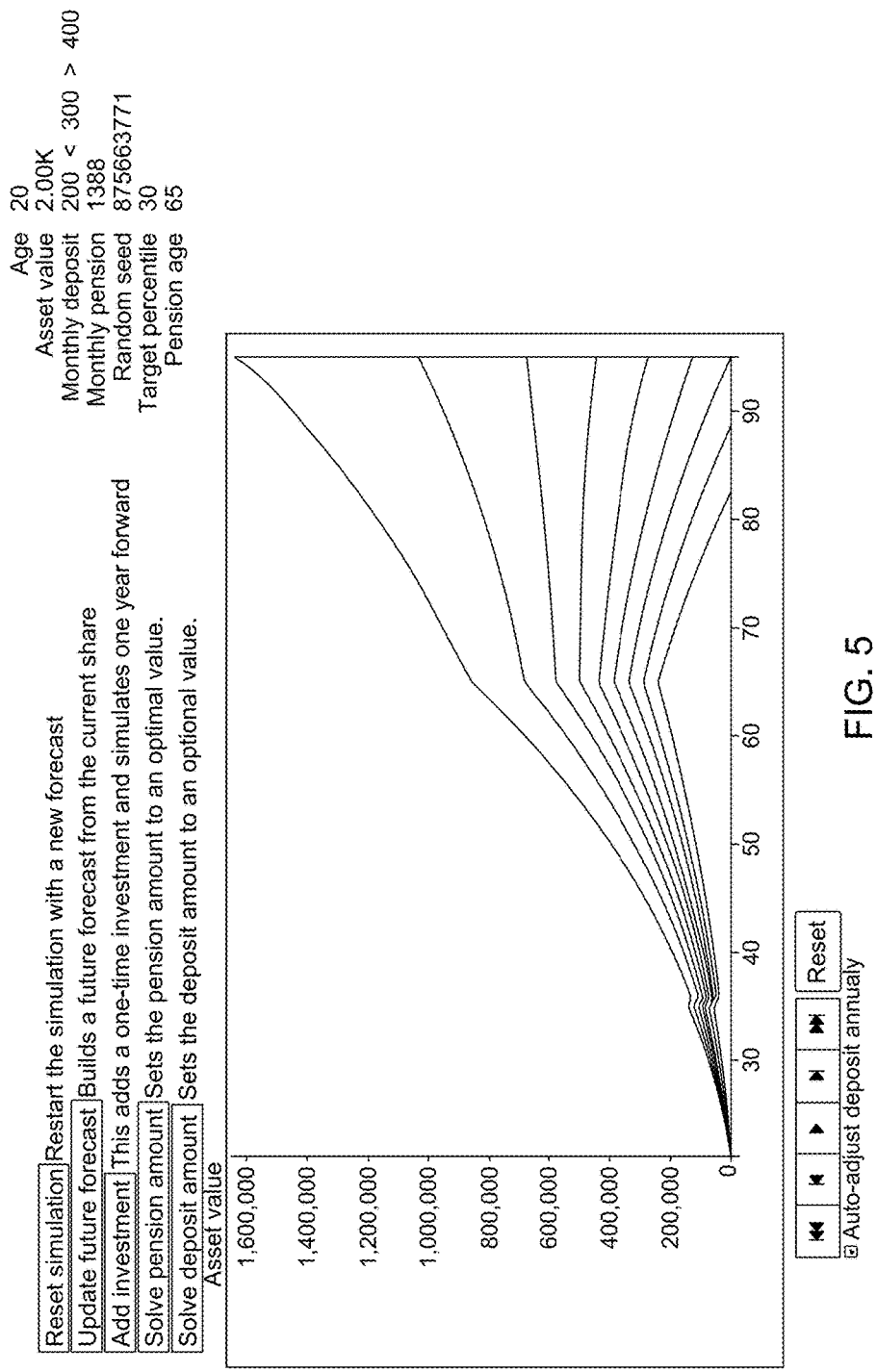
FIG. 5 illustrates an example interactive simulation input screen before a user begins an automated simulation run in the target result optimizing application, according to embodiments disclosed herein.
Figure 6:
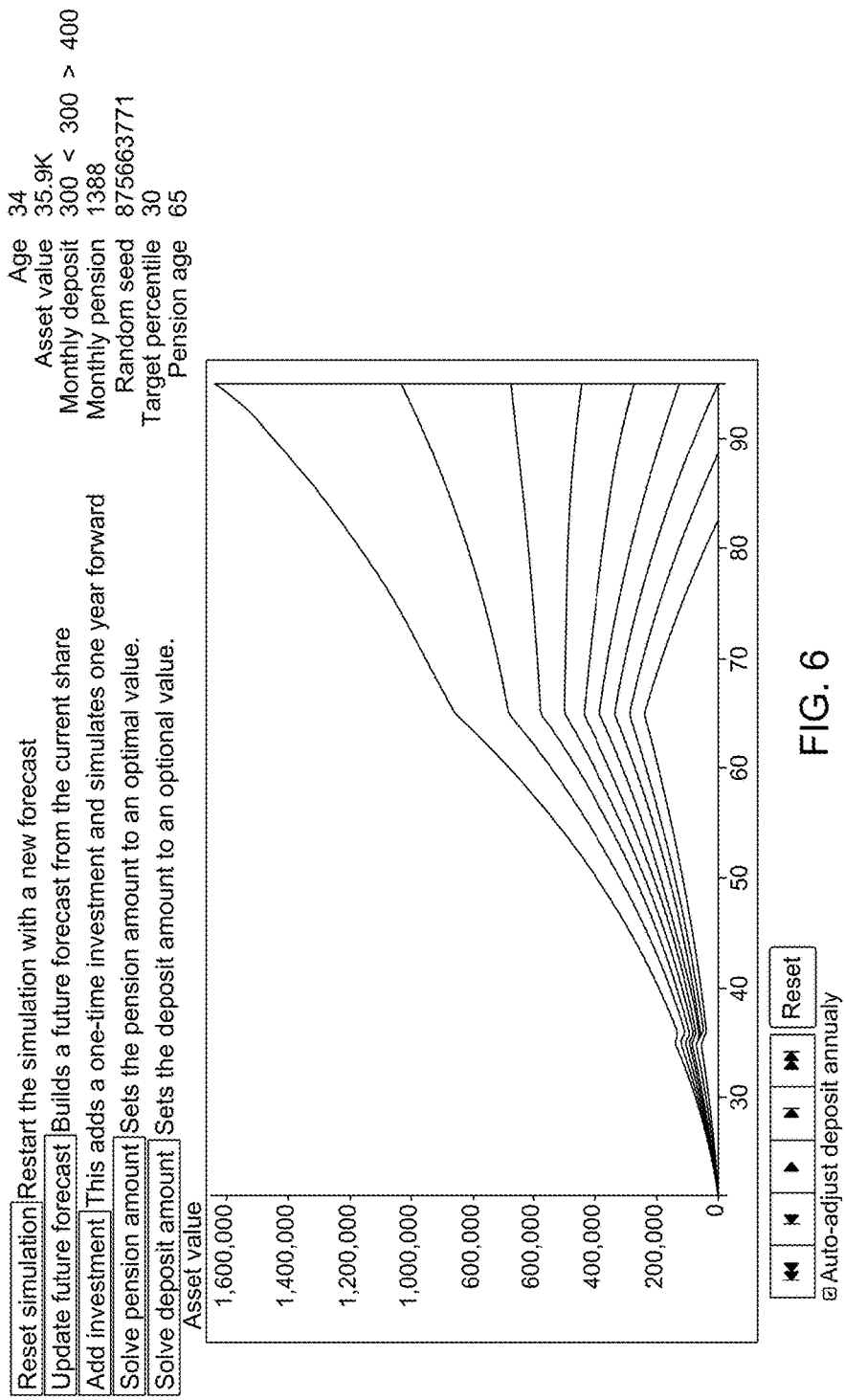
FIG. 6 illustrates an example interactive simulation input screen when a user begins an automated simulation run in the target result optimizing application, according to embodiments disclosed herein.
Figure 6:
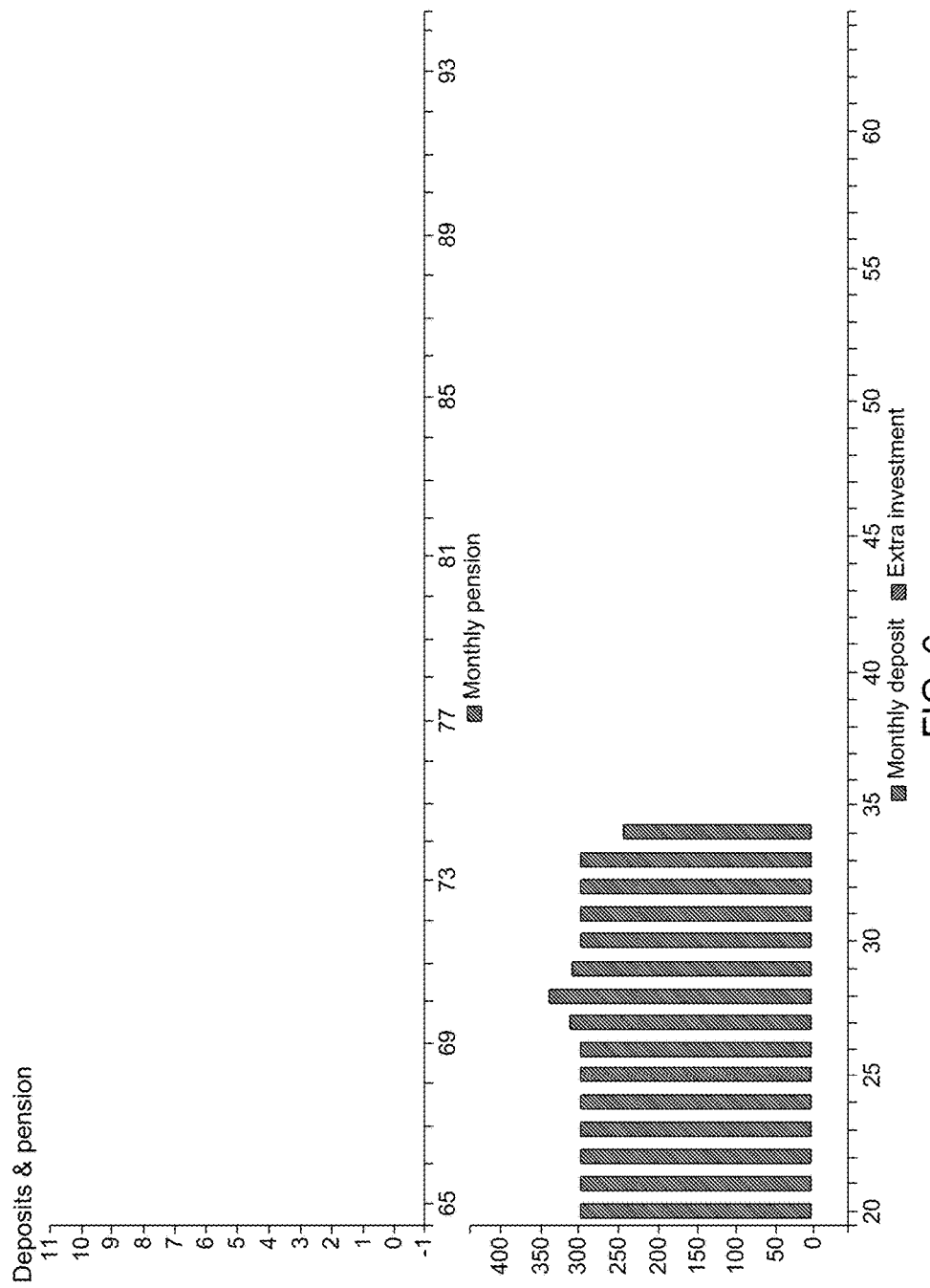
Figure 7:
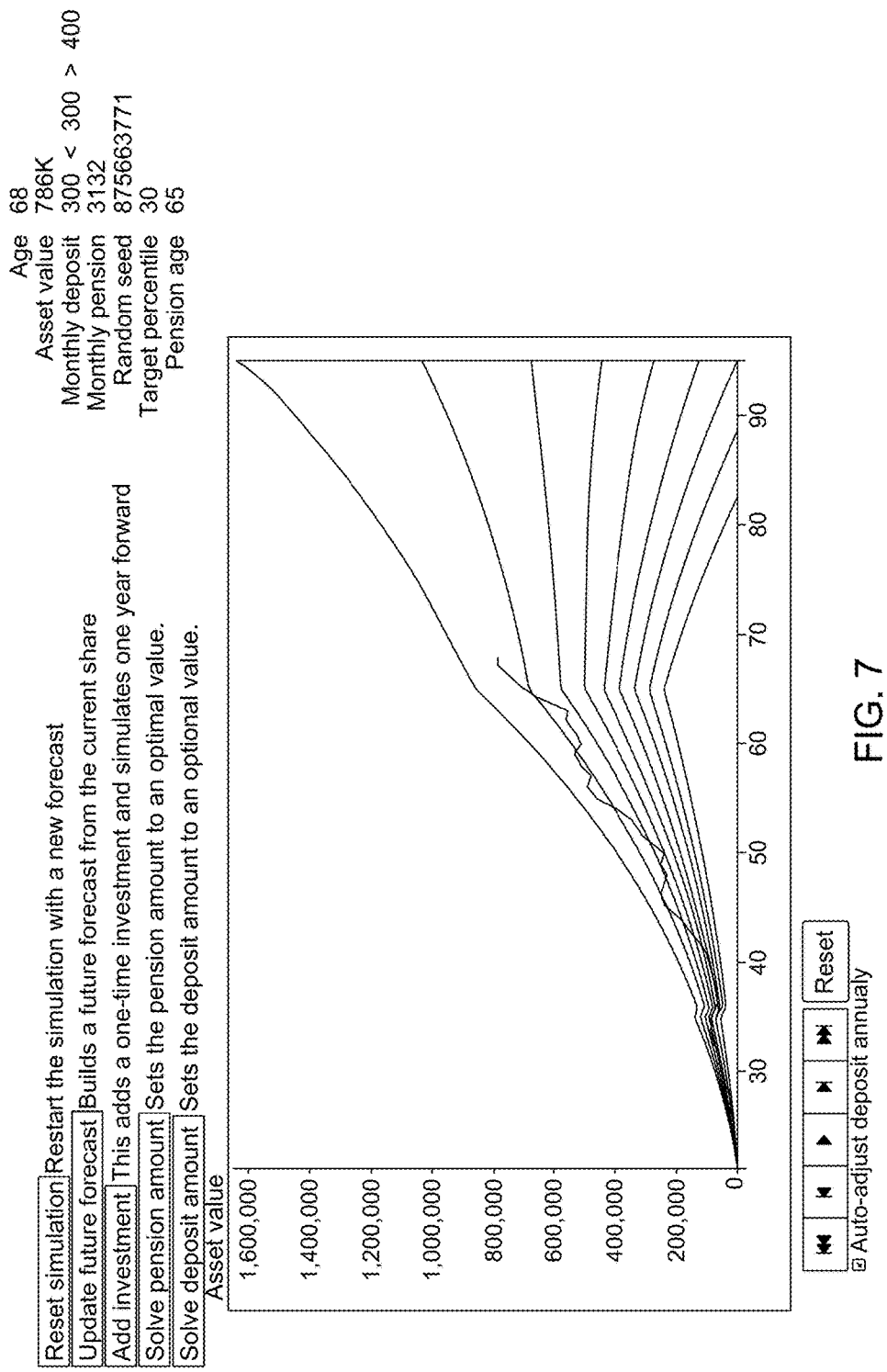
FIG. 7 illustrates a continuation of the example automated simulation run of FIG. 6, according to embodiments disclosed herein.
Figure 7:
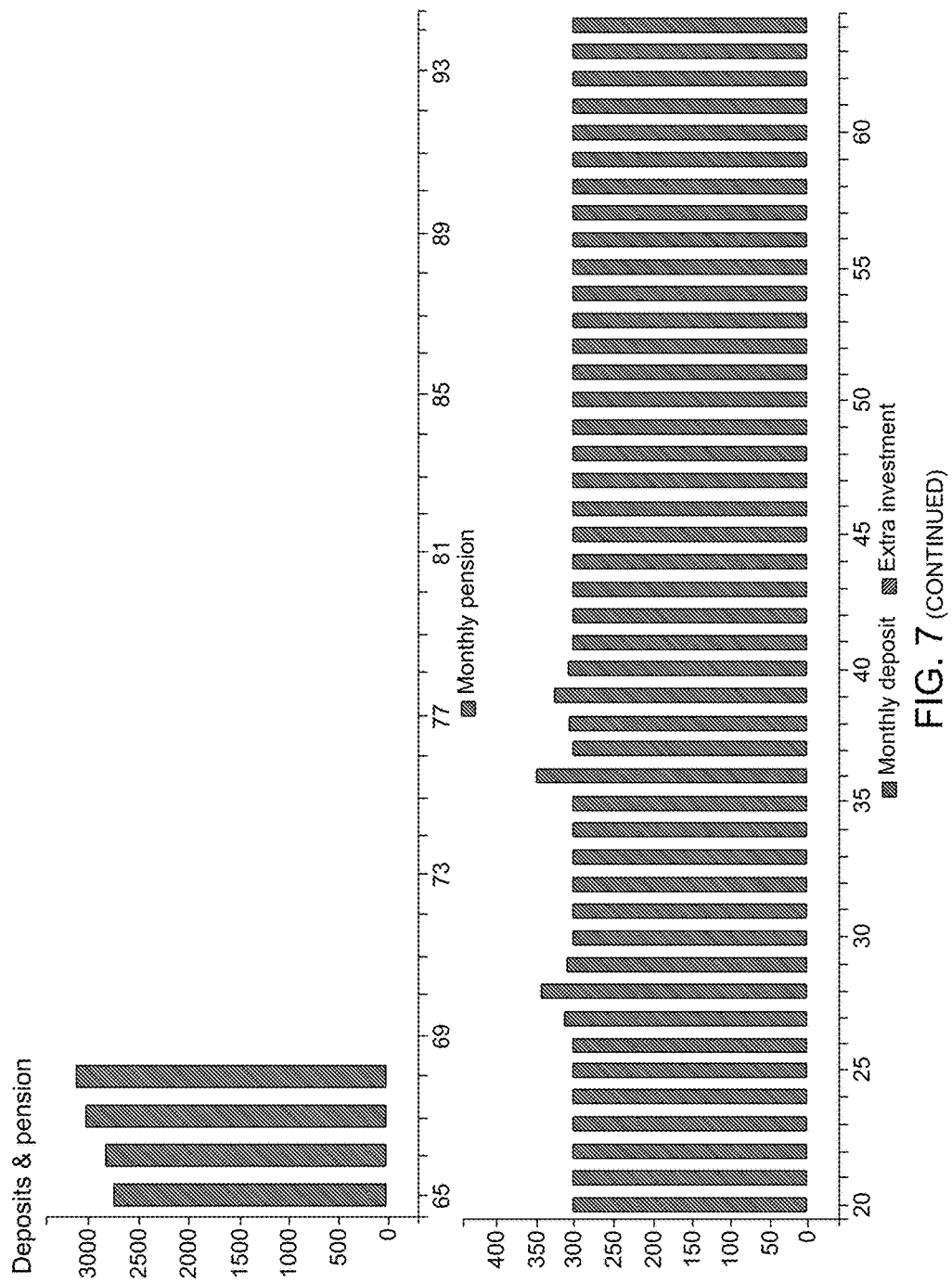
Figure 8:
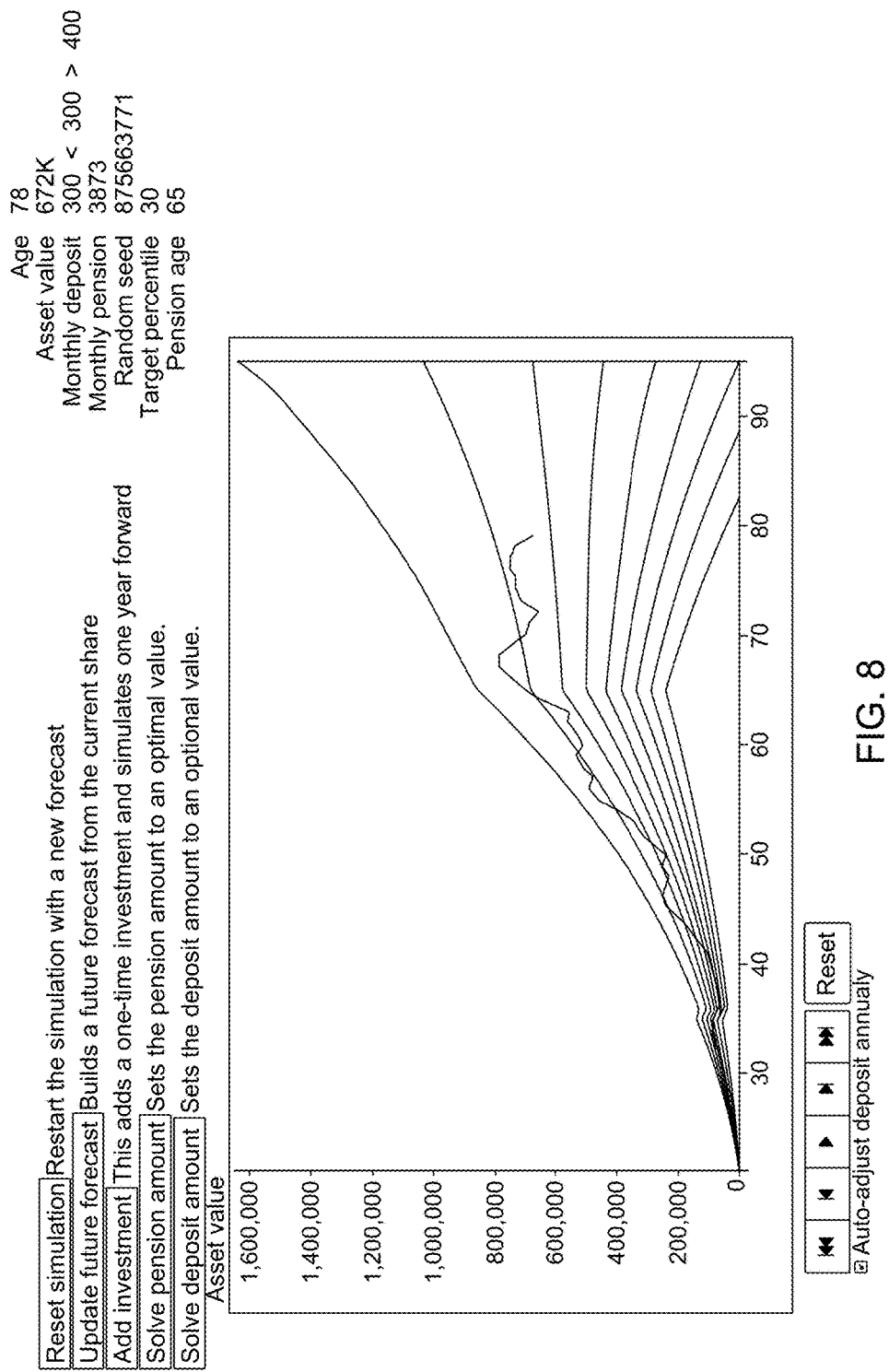
FIG. 8 illustrates a continuation of the example automated simulation run of FIG. 7, according to embodiments disclosed herein.
Figure 8:
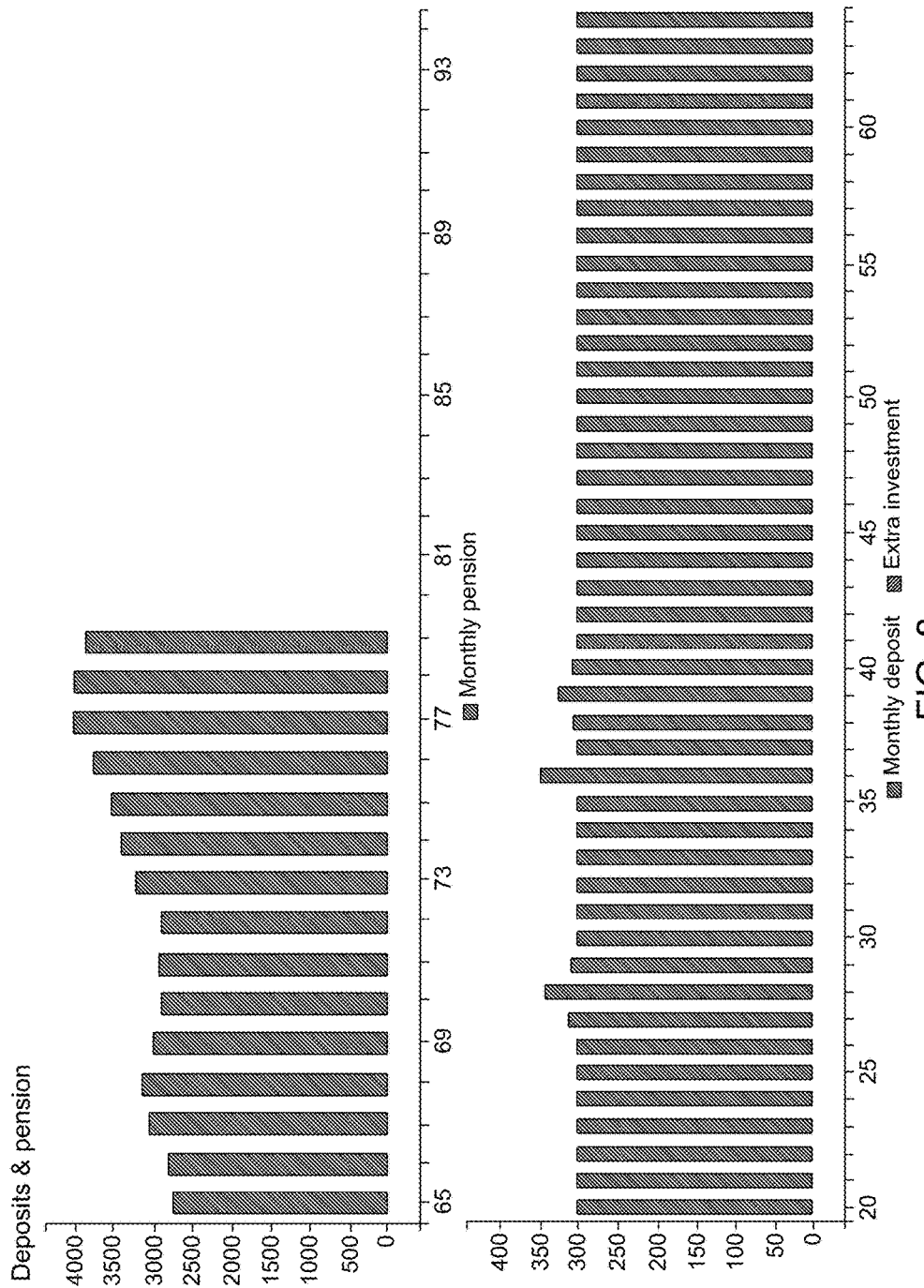

Embodiments disclosed herein provide optimizing a target result. The following description is presented to enable one of ordinary skill in the art to make and use embodiments disclosed herein, and are provided in the context of a patent application and its requirements. Various modifications to the embodiment will be readily apparent to those skilled in the art and the generic principles herein may be applied to other embodiments. Thus, embodiments disclosed herein are not intended to be limited to the embodiment shown but is to be accorded the widest scope consistent with the principles and features described herein.

Embodiments disclosed herein can take the form of an entirely hardware embodiment, an entirely software embodiment or an embodiment containing both hardware and software elements. In a preferred embodiment, embodiments disclosed herein are implemented in software, which includes but is not limited to firmware, resident software, microcode, etc.

Furthermore, embodiments disclosed herein can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of embodiments disclosed herein. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 illustrates a system for optimizing a target result according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or with one or more external devices 111, such as a display 110, via I/O interfaces 107. The memory 101 may include computer readable media in the form of volatile memory, such as random access memory (RAM) 102 or cache memory 103, or non-volatile storage media 104. The memory 101 may include at least one program product having a set of at least one program code modules 105 that are configured to carry out the functions of embodiments of the present invention when executed by the processor 106. The computer system 100 may communicate with one or more networks via network adapter 108.

Figure 11:
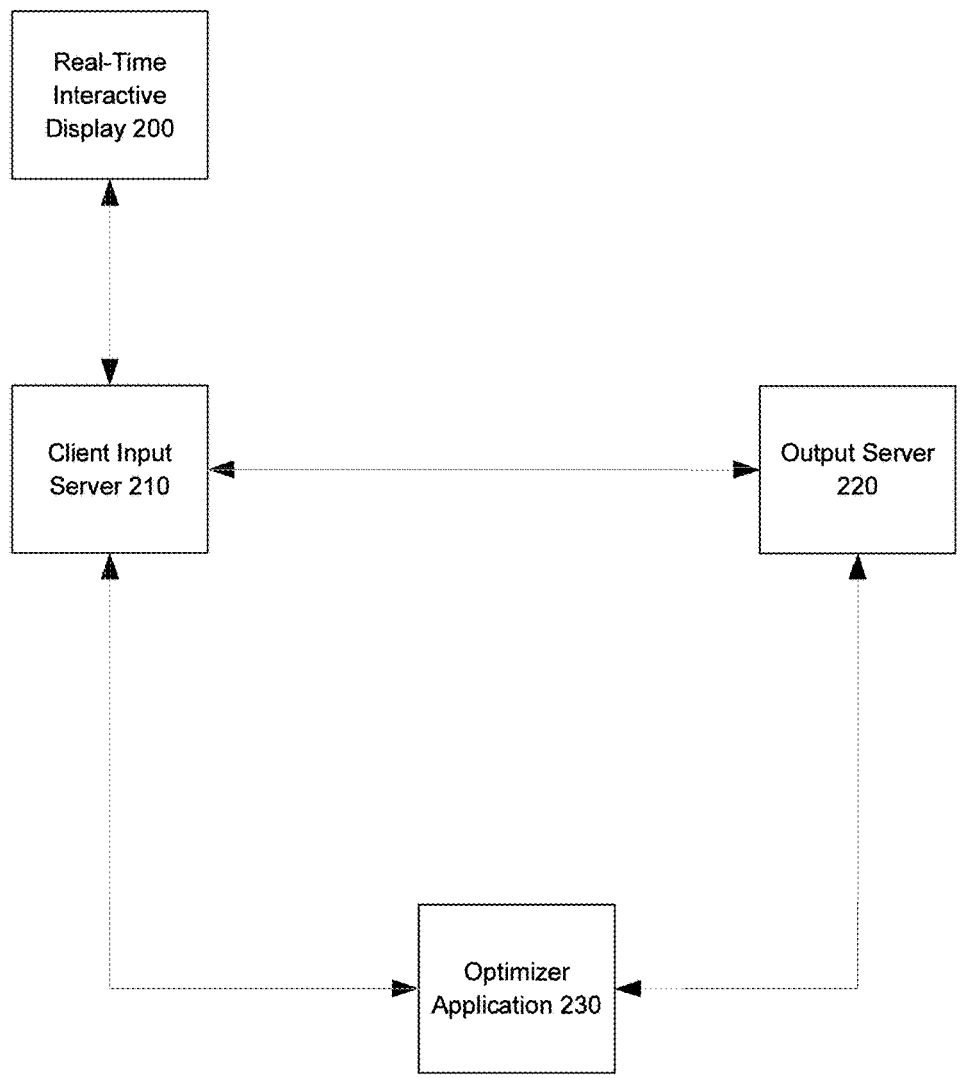
FIG. 11 illustrates a high level system for optimizing a target result according to embodiments disclosed herein.

In a target result optimizing application operating on the processor 106, a client input server 210, as illustrated in FIG. 11, receives a target result from a user via a real-time interactive display 200 as illustrated in FIG. 2. The target result comprises at least one of a goal, and a statistical probability that the target result is achievable. The target result may be, for example, an investment plan for a pension. The goal may be, for example, a pension with an annual withdrawal amount (also referred to as a withdrawal plan), and the statistical probability that the target result is achievable may be, for example, a probability percentage that the investment plan is achievable. The target result is to be achieved during a time period such as an investment period, beginning at a target result start point, and ending at a target result end point, such as the beginning of an investment period, and the end of the investment period.

A user enters input in the interactive input screen that may be online or a desktop application. The target result optimizing application accepts input related to the target result. For example, the target result may be related to an investment portfolio. In this scenario, the input may include but is not limited to the type of currency to be profiled (i.e., USD, Euro, Pesos, Lira, etc.), the age at which the user starts making the investment, the age at which the user stops making the investment, the age at which the user desires to begin to draw from the investment, an annual deposit, a minimum and/or maximum annual deposit, an initial investment, stop time asset value (i.e., how much money is left in the fund at the end of the investment period, also referred to as the target result value), stop percentile (i.e., the lowest success rate), bond percentage at the start of the investment period, bond percentage at the end of the investment period, desired annuity amount, stock index, bond index, inflation rate (the stock index, bond index, and/or inflation rate may be automatically obtained or manually entered by the user), transaction cost of each buy/sell trade. The user may specify a probability percentage that the withdrawal plan specified will be achieved, for example, "I aim for an 80% chance of reaching my withdrawal plan". The user may choose whether to optimize a strategy associated with the target result. The user may also choose whether inputs and outputs are adjusted for inflation.

In an example embodiment, the target result may be an investment plan, and the strategy may be an investment strategy. Within the investment strategy, the percentage of financial instruments within the financial portfolio, such as stocks and bonds, may be tailored at each point of the duration of the investment period. For example, the user who is investing at 25 years of age may split the stocks and bonds according to a higher risk ratio than the user who is investing at 65 years of age. The target result optimizing application adjusts the percentage of stocks and bonds according to a timeline associated with the duration of the investment (i.e., the investment period or the time period). In this example, the investment includes stocks and bonds, but the investment may include any assets.

After the client input server 210 receives the target result from a user via a real-time interactive display 200, the target result is transmitted from the real-time interactive display 200 to the client input server 210. The client input server 210 transmits the target result to an output server 220. The output server 220 compiles an interactive strategy to achieve the target result. The interactive strategy comprises a timeline starting at the target result start point, and ending at the target result end point. For example, the target result may be an investment plan, where the target result start point and the target result end point are, respectively, the beginning and the end of the investment period. In this scenario, the withdrawal plan (also referred to as the goal) may comprise any payments specified by the user and the point(s) along the investment period when the user desires to withdraw those payments. In other words, the withdrawal plan may be a pension with an annual withdrawal amount. The withdrawal plan allows the user to also include withdrawals during various points along the investment period. For example, the user may want to make a lump sum withdrawal at some point during the investment period, or may want to make periodic withdrawals during the investment period. Thus, the withdrawal plan may include, but is not limited to, a pension withdrawal, lump sum withdrawal, any periodic payment, or any payment according to any schedule. In other words, the withdrawal plan may be withdrawn yearly, monthly, etc., or may be withdrawn according to any schedule, periodic or otherwise, or a one-time withdrawal.

The target result optimizing application provides a user with a strategy that matches the user's goal. In an example embodiment where the target results is an investment plan, the strategy may be an investment strategy that matches the user desired withdrawal plan (i.e., the goal). In this scenario, the investment portfolio comprises a plurality of financial instruments. The target result optimizing application accepts a variety of inputs from the user, as shown in FIG. 2. The investment period may include the time when the user is contributing to the investment portfolio, and the time when the user is drawing from the investment portfolio (for example, the user may start investing at age 25, and may start drawing from the investment at age 65). The user may set an annual investment maximum, or the target result optimizing application may be programmed according to existing financial regulations for investment maximums. The target result optimizing application calculates the amount of investments needed over the (user specified) investment period to achieve the specified withdrawal plan with the specified probability.

In an example embodiment, the target result optimizing application determines an optimal strategy for the target result at the target result end point. An investment strategy is an example optimal strategy for the target result of an investment plan. The user may specify the number of years during which they wish to invest in the financial instrument(s), the initial investment, the periodic deposits, the years during which they wish to draw from the financial portfolio, and the target annuity (that they wish to receive during the years they are drawing from the financial portfolio). For example, the user may specify that they are aiming for an 80% chance of reaching their withdrawal plan. Based on this input, the target result optimizing application automatically calculates an optimal financial strategy for that investment portfolio (given a model used to calculate that investment portfolio), aiming for the success rate specified by the user. For example, the target result optimizing application may specify, "If you follow this plan, there is an 80% chance that your monthly annuity will be at least $5500" (an annuity amount entered by the user in the real-time interactive display 200). The target result optimizing application may also suggest how increasing the periodic deposit affects the probability that the withdrawal plan will be achieved. For example, the target result optimizing application may specify, "For an additional $500 per month, you will have a 90% chance to reach the goal for your monthly annuity".

Continuing with the example of an investment plan as the target result, in an example embodiment, the user may define the withdrawal plan (i.e., the goal), or the user may request that the target result optimizing application calculates the withdrawal plan on behalf of the user. For example, the user may know when he/she anticipates drawing a pension, and when the user plans on retiring, and therefore can define the details of the withdrawal plan. Alternatively, the user may want to know when he/she can begin to withdraw a pension, or how much of a pension the user can expect, given the financial portfolio. Thus, when the user enters input into the interactive input screen, the user may leave some fields blank (such as the initial amount invested, the annual contribution, the withdrawal amount, or the withdrawal age) and the target result optimizing application calculates a withdrawal plan or a probability percentage for the user. The user may also access a pre-defined withdrawal plan that provides the user with a sample withdrawal plan. The pre-defined withdrawal plan may be helpful if the user is unsure where to begin with his/her financial investments. In an example embodiment, the withdrawal plan may be a pension plan. In this scenario, the withdrawal amount is a pension amount, and the withdrawal age is a pension age as illustrated in FIG. 2 and FIG. 4.

Regardless of whether the user defines some or all of the withdrawal plan (i.e., the goal), or accesses a pre-defined withdrawal plan, the target result optimizing application may optimize the strategy (in this case an investment strategy) for the goal (i.e., the withdrawal plan). In an example embodiment, after the user provides the input parameters, the client input server 210 connects to an output server 220 and provides the input parameters. The output server 220 interfaces with an optimizer application 230, and provides the optimizer application 230 with parameters based on the input parameters from the user.

An optimizer application 230 with an optimizer interface that interfaces with the client input interface (i.e., the real-time interactive display 200) of the client input server 210 and/or the output interface of the output server 220 optimizes at least a portion of the interactive strategy as illustrated in FIGS. 3-10, depicting an example investment plan as the target result. The optimizer application 230 interfaces with a model generator that models at least one future performance model associated with the target result, and obtains the future performance model from the model generator. The optimizer application 230 determines an optimal strategy for the target result at the target result end point, where the optimal strategy comprises a target result value, for example, a total amount of money saved for retirement. In this scenario, the optimizer application 230 determines an optimal investment plan at any point during the investment period so as to accumulate the desired amount of funds at the end of the investment period that will provide the desired amount of pension funds throughout the withdrawal period of the pension. The optimizer application 230 determines the allocation for the financial instruments in the financial portfolio for each year during the investment period. The optimizer application 230 determines how to invest the assets in the financial portfolio, predicting the best splits for the financial instruments so as to attain the highest probability of achieving the withdrawal plan. When making this determination, the optimizer application 230 takes into account, at any given point in time, the asset value of the financial portfolio and the years remaining in the investment period. The target result optimizing application uses the information provided by the optimizer application 230 to recommend redistributing the allocation of financial instruments to achieve the desired annuity. In an example embodiment, the target result optimizing application may recommend that assets (such as the financial portfolio) in the target result be reallocated. For example, the target result optimizing application may recommend that the percentages of stocks versus bonds be reallocated, and may advise to sell stocks to purchase bonds, etc. In an example embodiment, the calculated reallocation of financial instruments may be automatically entered as input into financial accounts (for example, the user's retirement account at a financial institution) to provide constant, up to date, investment strategy advice. In another example embodiment, the target result optimizing application may automatically invest in index funds, or other simple, low cost, well performing equity funds. The computed allocation may be recalculated at any time the input parameters change.

The optimizer application 230 determines an optimal strategy for the target result at the target result end point, where the optimal strategy comprises a target result value. Using the example of an investment plan as a target result, the optimizer application 230 determines the investment strategy of how to allocate the financial instruments within the financial portfolio for each year during the investment period, where the target result value may be, for example, the total amount of money saved for retirement. To determine this allocation, the optimizer application 230 builds an investment strategy table with the number of years remaining (within the investment period) on the X axis, and the total asset value (at that time) on the Y axis. In an example embodiment, the target result optimizing application keeps entries for a discreet set of asset values, and then uses interpolation when reading the investment strategy table. Each table cell contains the optimal percentage of financial instruments to use, and also the probability distribution function for the asset value at the end of the investment period. In an example embodiment, the optimization may be performed for portions of the investment period.

In an example embodiment, after determining the optimal strategy, the target result optimizing application determines at least one second optimal strategy for the target result at a first location in the timeline between the target result end point and the target result start point, using the future performance model. The future performance model provides a performance indicator for the target result at the first location to achieve a sub target result value at the target result end point. In another example embodiment, the target result optimizing application incorporates a previous interval target result value when determining at least one third optimal strategy for the target result at a current interval, where the previous interval target result value is an estimated target result value calculated at a previous interval, and where the current interval is closer to the target result start point than the previous interval. In other words, the target result optimizing application calculates the target result at the end of the time period (first location), calculates the target result at some point prior to the end of the time period (second location), such as one year prior to the end of the time period, and then calculates the target result at a third location at some point prior to the second location such that the target result optimizing application is calculating the target results backwards, starting at the end of the time period. When the target result optimizing application calculates the target result at the third location, the target result optimizing application incorporates the target result calculated at the second location.

Figure 10:
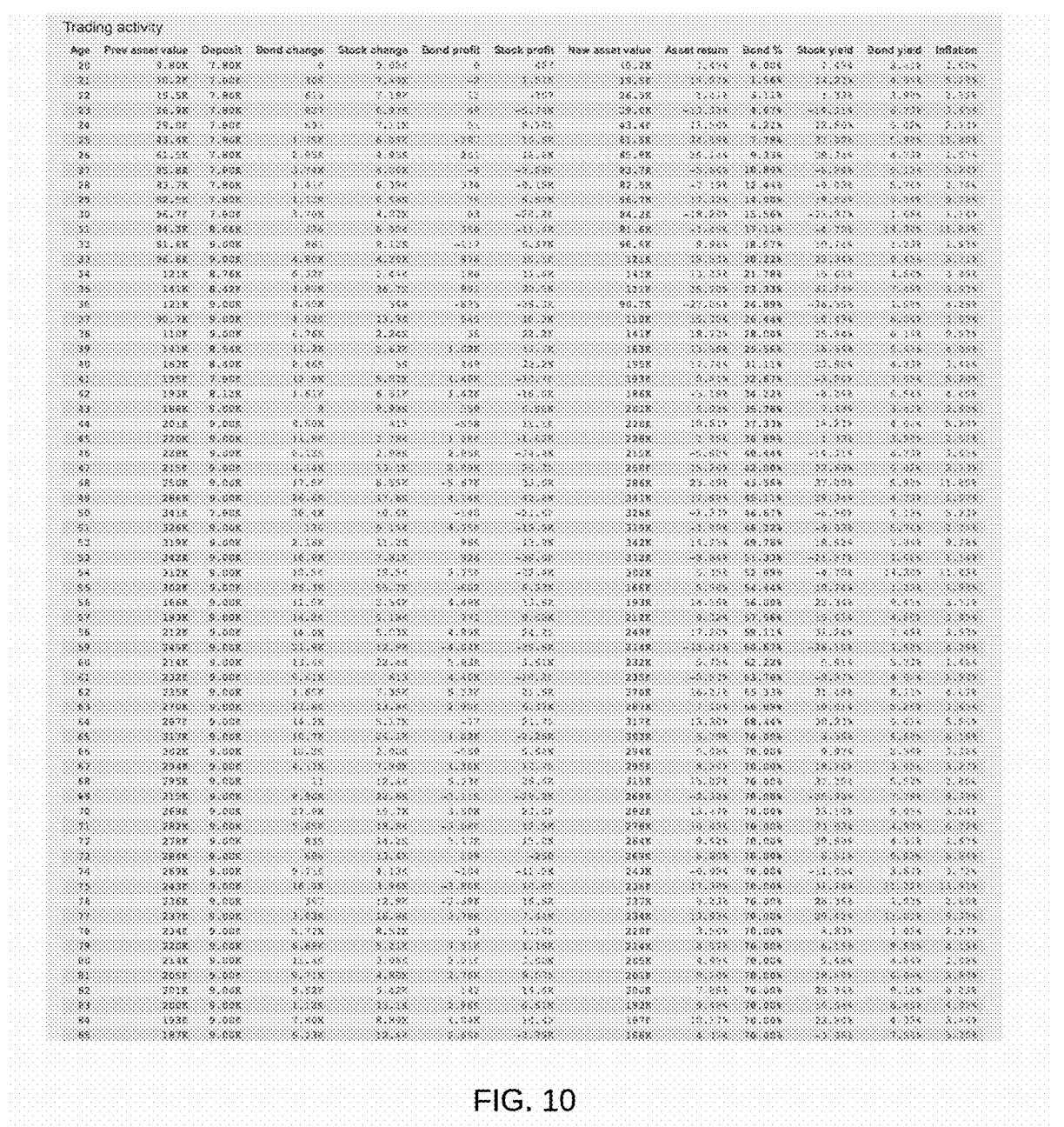

The target result optimizing application renders the optimized interactive strategy, the statistical probability, and the target result for the user on the real-time interactive display 200 as illustrated in FIG. 4 and FIG. 10. The statistical probability is predictive of achieving the target results. The optimized interactive strategy is transmitted from the output server 220 to the client input server 210 to be rendered on the real-time interactive display 200. The target result optimizing application may render the optimized interactive strategy real-time as the optimized interactive strategy is generated, and/or may render a previously generated optimized interactive strategy that is displayed when a user invokes the rendering of the optimized interactive strategy. The target result optimizing application may also provide the user with a recommendation to achieve the target result.

Using the example of an investment plan as the target result, the target result optimizing application allows a user to specify an expected (or desired) withdrawal plan, or goal (such as a pension amount that the user would like to draw upon in retirement), for example, "I would like a $5400 per month pension to draw upon in 35 years from now" as illustrated in FIG. 2 and FIG. 4. The target result optimizing application returns the probability percentage that the expected withdrawal plan is likely to be achievable, for example, "There is an 85% probability that the pension amount of $5400 per month will be available to draw upon in 35 years from now" at the end of the investment period, as illustrated in FIG. 4. Or, the user may specify the probability percentage of an achievable withdrawal plan, and the target result optimizing application returns a pension amount that is in line with the probability percentage specified by the user.

In an example embodiment, the output server 220 prepares the output to be sent to the client input server 210. The target result optimizing application then transmits the output from the output server 220 to the client input server 210. The client input server 210 then processes the output for display on the real-time interactive display 200 for viewing by the user.

In an example embodiment, the target result optimizing application receives an invocation from the user, via the real-time interactive display 200, to activate the optimized interactive strategy. The target result optimizing application simulates the optimized interactive strategy over the course of the time period, on the real-time interactive display 200 as illustrated in FIGS. 3-10. The simulated optimized interactive strategy renders at least one second optimal strategy along with the optimal strategy, starting at the target result start point and ending at the target result end point. Continuing with the example of an investment plan as the target result, in an example embodiment, the target result optimizing application builds an investment strategy table starting at the end of the investment period (i.e., zero years left), the last column in the investment strategy table. In an example embodiment, the target result optimizing application may calculate the target result value at the target result end point using various analytical methods, or for example, using a Monte Carlo simulation. This last column is trivial; the asset value at the end of the investment period is the same as the amount invested (at the end of the investment period). The optimal financial instrument percentage (i.e., the allocation of the financial instruments in the financial portfolio) may be left undefined since the investment period has come to an end. To calculate the next to last column in the investment strategy table (i.e., one year left in the investment period), the target result optimizing application uses a model of market behavior to calculate the distribution of the asset value after one year. In an example embodiment, the target result optimizing application is not limited to only one model of market behavior. The target result optimizing application determines the (optimal) financial instrument percentage associated with the best distribution function. In an example embodiment, the target result optimizing application saves the best distribution function in the table cell along with the (optimal) financial instrument percentage. In an example embodiment, after the target result optimizing application determines the optimal strategy and then determines at least one second optimal strategy, the target result optimizing application iteratively determines at least one third optimal strategy for the target result, at the plurality of intervals in the timeline between the first location in the timeline and the target result start point. In other words, this process is repeated for each column in the investment strategy table moving from right to left (i.e., "backwards" according to the time period). Thus, for an investment strategy table with N years left in the investment period, when computing the (optimal) financial instrument percentage for a cell in the "N years left" column, the target result optimizing application has already determined the (optimal) financial instrument percentage for the "N−1 years left" column for all asset values.

Continuing the example of an investment plan as the target result, the target result optimizing application determines the optimal financial strategy for the financial instruments over time (for example, at yearly points) during the investment period. The user may run an automated simulation of the results of the withdrawal plan over the investment period to allow the user to see a big picture overview of the results of the withdrawal plan over time as illustrated in FIGS. 3-10. In an example embodiment, the user, such as a financial investment advisor, may run the target result optimizing application on behalf of an investing client periodically (i.e., yearly, monthly, etc.) to assess and re-assess current financial strategies, for example to determine if the financial plan is meeting the investing client's goals. The automated simulation simulates those periodic assessments over the course of, for example, the investing client's investment period, and may re-determine the optimal strategy at each point of time. In an example embodiment, when the target result optimizing application simulates the optimized interactive strategy over the course of the time period, the target result optimizing application determines a plurality of optimized interactive strategies, and randomly selects one of the plurality of optimized interactive strategies to present to the user on the real-time interactive display 200. In an example embodiment, the target result optimizing application calculates multiple example withdrawal plan scenarios (i.e., many of these iterative executions). When the user executes an automated simulation, the target result optimizing application randomly selects one of the calculated withdrawal plan scenarios to present to the user. The output of the automated simulation is an example of the results of the overall investment with the withdrawal plan over time, for example, the assets and the withdrawal plan in the financial portfolio at any given time during the investment period, displayed according to probability percentiles associated with the assets and a distribution of the investment's residual amount (e.g., at the end of the investment period, 10% probability that the asset value will be $166k and the distribution of the investment's residual amount will be $1.31K/month, through 90% probability that the asset value will be $1.4M, and the distribution of the investment's residual amount will be $3.34k/month, with the asset values and probability percentiles calculated at increments between 10% and 90%). In an automated simulation, the target result optimizing application creates an interactive annuity table that displays to the user the monthly annuity over the course of the years during which the investment drawn. The user may move a cursor over the electronic display to view individual values (i.e., the monthly annuity) at any given point along the timeline In an example embodiment, the user may choose to create a predictive matrix as illustrated in FIG. 2 using an investment plan as an example target result. The target result optimizing application builds the predictive matrix by running multiple simulations with ranges of values specified by the user. The predictive matrix is a table that displays how outputs vary when the user changes two of the inputs to the target result optimizing application. Continuing the example of an investment plan as the target result, the user may vary inputs such as the age at which the user receives a withdrawal amount. The user may vary two of the inputs to the target result optimizing application. In response, the target result optimizing application creates a table that illustrates how at least one of the computed properties varies when the two inputs (specified by the user) are varied. For example, if the user is computing a pension withdrawal plan (i.e., the goal), the user's retirement age may vary from 55 to 75 years of age, two years at a time, for a total of 10 different ages/steps between 55 and 75. In other words, the rows of the predictive matrix are determined by data entered by the user specifying "Stop year min", "Stop year max", and "Stop year steps". The user's annual investment may vary from $1300 to $1500, at increments/steps of $200, for a total of 10 different amounts invested. In this example embodiment, as illustrated in FIG. 2, the columns of the predictive matrix are determined by data entered by the user specifying "Annual investment min", "Annual investment max" and "Annual investment steps" (indicating the granularity of the predictive matrix). The target result optimizing application creates a 10×10 table showing the expected pension amount the user could be expected to draw over the 10 years of retirement. The user may navigate the predictive matrix using a navigation interface where the user can modify one value, and instantly see how that modification affects other values within the withdrawal plan. The percentile indicates the level of success the user would like to achieve. In an example embodiment, the percentile may be set by the user.

In an example embodiment, the target result optimizing application provides the user with at least one interactive control to interact with the simulated optimized interactive strategy during the simulating, via the real-time interactive display 200. As noted above, the user may navigate the predictive matrix using a navigation interface. As an example of the navigation interface, and continuing the example of an investment plan as the target result, interactive sliders allow the user to adjust the annual investment and the stop year, and instantly view how those adjustments impact the asset values. As the user manipulates the interactive sliders, the target result optimizing application recalculates the stop time asset value (i.e., the value of the assets if the user were to stop investing at the age the user selects using the "stop year" slider).

In an example embodiment, when the target result optimizing application simulates the optimized interactive strategy over the course of the time period, the target result optimizing application incorporates data streamed from a real time online database into the simulated optimized interactive strategy and/or a future simulated optimized interactive strategy. For example, when the user runs an automated simulation for an investment strategy (where an investment plan is the target result), the target result optimizing application interfaces with the current market data. The target result optimizing application may take a snapshot of the current market data for use during the execution of the automated simulation. Alternatively, the target result optimizing application may take a snapshot of the market data and use that data for future simulation executions. In an example embodiment, if, during the rendering of the automated simulation the target result optimizing application determines that the target result is not achievable, the target result optimizing application iteratively adjusts at least one of a plurality of inputs associated with the target result, and simulates the optimized interactive strategy until achieving the target result. In other words, if the output of the automated simulations indicates that the desired withdrawal plan (i.e., the goal) is not attainable, the output server 220 re-runs the automated simulations using the range of acceptable monthly deposit (i.e., max and min ranges supplied by the user within the interactive input screen). The output of the automated simulations is the withdrawal plan and the probability that the withdrawal plan will be achieved. In an example embodiment, if, during the rendering of the automated simulation, the target result optimizing application determines that the target result is achievable, the target result optimizing application iteratively adjusts at least one of a plurality of inputs associated with the target result, and simulates the optimized interactive strategy until the target result is within an acceptable target result range. In other words, if the withdrawal plan is achievable, the output server 220 re-runs the automated simulation with adjusted inputs until the output of the automated simulation is within the range of the withdrawal plan. Thus, if the user were executing the target result optimizing application to determine an investment plan, the range would provide the user with flexibility in terms of, for example, how much the user would need to invest, or periodic contribution amounts. In an example embodiment, if, during the rendering of the automated simulation, the target result optimizing application determines that the target result is not achievable, the target result optimizing application determines a highest suboptimal target result that is achievable and a highest statistical probability that the highest suboptimal target result is achievable. The target result optimizing application may automatically modify at least one of a plurality of inputs, and/or may prompt the user to change at least one of the plurality of inputs. In other words, if the withdrawal plan (i.e., the goal) is not achievable, the target result optimizing application will return the highest amount of money that is achievable with the highest probability. The output server 220 then determines if there are any additional simulations to be executed (i.e., was the automated simulation executed for each year specified within the input parameters), and if so, re-runs the automated simulations for each of those years.

In an example embodiment, during the simulating of the optimized interactive strategy, the target result optimizing application may obtain at least one sub target result from the user, and render the simulated optimized interactive strategy with the incorporated into the optimized interactive strategy. The target result optimizing application may also obtain at least one sub target result from the user via the real-time interactive display 200, where the sub target result occurs between the target result start point and the target result end point, and then incorporate the sub target result into the optimized interactive strategy. The target result optimizing application may provide the user with at least one interactive control to incorporate at least one sub target result into the simulated optimized interactive strategy. The sub target result may comprise adding a first asset and/or removing a second asset. In other words, during the execution of the automated simulation (i.e., the optimized interactive strategy), using an example embodiment of an automated simulation of an investment strategy, the user may stop the automated simulation to insert data points where the user wishes to withdraw funds from (or add funds to) the investment portfolio. For example, the user may start investing at age 32, and plan to draw on the investment portfolio at age 70. However, the user may anticipate that, at age 50, the user will have to draw on the investment portfolio, each year, for five years, to put a child through college. Or, the user may receive a bonus that he/she wants to add to the investment portfolio. The user may add these data points to the automated simulation, and the target result optimizing application will incorporate these data points into the automated simulation and risk analysis. In the example where the user withdraws funds from the investment portfolio during the investment period, the target result optimizing application rebalances the investments such that the user will be able to withdraw the funds at the points in the timeline specified by the user, and such that the liquidity of the investments will allow the user to withdraw the needed funds during that five year period. In an example embodiment, the target result optimizing application then recalculates the withdrawal plan at the end of the investment period (for example, when the user draws a pension amount from the investment portfolio), and verifies whether the user specified withdrawal plan is still achievable within the probability percentage specified by the user. In performing this recalculation, the target result optimizing application incorporates into the new calculation the withdrawals that the user planned for within the investment period. For example, as noted above, the user may plan to withdraw from the financial portfolio midway through the investment period to pay for a child's college education. In this scenario, the target result optimizing application recalculates the user's pension (at the end of the investment period), and the probability percentage that the user will be able to withdraw this amount at retirement. If the retirement withdrawal plan is not within the range specified by the user, the target result optimizing application may recommend changes to the user's investment strategy, such as increasing the amount the user periodically invests in the financial portfolio (for example, increasing monthly deductions from the user's paycheck). In an example embodiment, if the user runs an automated simulation that does not meet the withdrawal plan, the user may adjust inputs, such as the withdrawal plan, the periodic deposit, the age at which the user begins to draw from the annuity, etc., and then re-run the automated simulation to perform the risk analysis by creating a probability simulation using the updated inputs. The user may continue to modify the simulation execution until the user is satisfied with the withdrawal plan and the risk profile.

In an example embodiment, when the client input server 210 receives the target result from the user via the real-time interactive display 200, the target result optimizing application automatically interfaces with an online account associated with the user to transmit, from the online account to the client input server 210, input relevant to the target result. The automatic interfacing may comprise automatically logging into the online account. In an example embodiment, the client input server 210 server receives input parameters within the interactive input screen, for example, from the user. Using the example of an investment plan as the target result, the target result optimizing application may interface with an online database of historical financial data, such as stocks, bonds, inflation, etc., to obtain financial data for the input parameters. In another example embodiment, the client input server 210 interfaces with online financial accounts to obtain financial data (associated with the user) for the input parameters. For example, the client input server 210 may automatically log into the user's online bank accounts to obtain financial data, including account balances, financial portfolios, etc.

In an example embodiment, the client input server 210 receives the target result from the user via the real-time interactive display 200, and receives the goal from the user. When the optimizer application 230 optimizes the interactive strategy, the optimizer application 230 determines the statistical probability (that the target result is achievable) based on the goal inputted by the user. In another example embodiment, when the client input server 210 receives the target result from the user via the real-time interactive display 200, the client input server 210 may also receive the statistical probability from the user. In this example embodiment, the optimizer application determines the goal based on the statistical probability inputted by the user. The optimizer application 230 may also automatically modify at least one of the plurality of inputs and/or prompt the user to change at least one of the plurality of inputs. The optimizer application 230 then re-optimizes at least a portion of the interactive strategy. Using the example of an investment plan as the target result, the plurality of inputs may comprise an investment period, an annuity drawing period, an initial investment, an investment maximum, a target annuity, and/or a periodic deposit.

In an example embodiment, when the model generator models the future performance model associated with the target result, the model generator models the future performance model comprising resources used to achieve the target result, and an allocation of each of the resources in the future performance model. The target result optimizing application determines the allocation of each of the resources at any point during the time period to attain a highest probability of achieving the target result. The target result optimizing application may also provide a recommendation to redistribute the allocation of each of the resources to achieve the target result. Continuing with the example of an investment plan as the target result, in an example embodiment, the target result optimizing application models the future performance of financial markets, and determines an optimal financial strategy for the financial instruments (in the investment portfolio) periodically over time (for example, at yearly points) during the investment period.

Financial strategies include how the financial instruments are allocated within the financial portfolio. The allocation of the financial instruments is used to determine the projections of the performance of the financial portfolio. The model generator may model the future performance model using data streamed from a real time online database. The model generator may also model the future performance model using an example of a past performance.

In an example embodiment, when the model generator models the future performance model associated with the target result, the target result optimizing application calculates a probability distribution function for the target result at the target result end point. The target result optimizing application chooses between two or more distribution functions when determining the best distribution function. In an example embodiment, when the target result optimizing application calculates the probability distribution function for the target result at the target result end point, the target result optimizing application selects the distribution function target result value from at least two distribution functions based on a risk profile specified by the user in the real-time interactive display 200. The target result optimizing application makes this selection depending on the risk profile specified by the user, for example, in the user input screen. Using the example of an investment plan as the target result, if all distribution functions reveal that the withdrawal plan (i.e., the goal) is achievable within the probability percentage (that the withdrawal plan will be achieved), then the target result optimizing application may choose the distribution function that predicts the highest expected asset value at the end of the investment period (i.e., the time period). The range of "within the probability percentage" means the user specified probability percentage or better/higher. If the distribution functions reveal that none of them will achieve the withdrawal plan within the probability percentage, then the target result optimizing application selects the distribution function that predicts achieving the highest annuity amount within the user specified probability percentage. Thus, the withdrawal plan may be adjusted (for example, the annuity amount may be lowered) so that it is possible to achieve the withdrawal plan with a given probability.

As noted above, and continuing to use the example of an investment plan as a target result, the target result optimizing application uses a model of market behavior to calculate the distribution of the asset value after one year (when calculating the next to last column in the investment strategy table). The target result optimizing application stochastically models the financial markets by modeling, for example, inflation, stock yields, and bond yields. In an example embodiment, the target result optimizing application maintains a table of past market behavior during a period of years. An example model assumes that each year in the future will behave like a randomly selected year from the past. The target result optimizing application may also select a plurality of consecutive years to model year-to-year correlation. In another example embodiment, the target result optimizing application uses a covariance matrix that contains the means and the cross correlations between inflation, stock yield, and bond yield. This other example model assumes that years are independent, and the covariance matrix itself may come from any source, including computing statistic measures from a table of historical data. A model may be automatically updated by streaming live market data (for example one or many live feeds of market data) in building the historical model.

Continuing with the example of an investment plan as the target value, in an example embodiment, during the execution of an automated simulation, the target result optimizing application creates an investment deposits table that displays the monthly deposits over the course of the years of investment. The user may add additional investments at any time during the years of investments (for example, if the user receives a bonus and chooses to add the bonus to the investment portfolio), and the investments table displays these additional investments visually differentiated from the monthly investments. The user may move a cursor over the electronic display to view individual values (i.e., the monthly deposits and/or additional investments) at any given point along the timeline.

In an example embodiment, the user may re-run the automated simulation, modifying the values. As the automated simulation is running, the user may stop, start, reverse, fast-forward, go back to the beginning and/or go straight to the end. In FIGS. 5-8, a user may follow the trajectory, step by step year by year etc. Continuing with the example of an investment plan as the target value, in an example embodiment, the user may also start and stop the automated simulation to add an additional investment to the current point in the automated simulation. For example, the user may stop the automated simulation at a particular point in the timeline to add an additional investment, and then re-start the automated simulation at the point where it was halted. The target result optimizing application continues its execution of simulating the forecast of the investment portfolio, displaying the additional investment along with the periodic investments along the timeline (visually differentiating between the additional investment and the periodic investments). The target result optimizing application incorporates any additional investments into the forecasting of the annuity payments.

Continuing with the example of an investment plan as the target value, in an example embodiment, the user may create and record multiple automated simulations of various financial strategies to review at a later time. For example, the user may create a financial strategy to set up a particular investment fund. The user may then run automated simulations on that particular investment fund to analyze the investment strategy. The investment strategy may then be used to improve the creation of future similar funds. The withdrawal plan may be extended to include stochastic events. In other words, the time periods of withdrawals and the values of those withdrawals may be specified as probability distributions instead of fixed amounts. Similarly investments may also be modeled as a stochastic process. With these extensions, the target result optimizing application may be used to profile more complex scenarios, for example, investment funds where the time periods when investors invest their funds and when the investors withdraw the funds is unknown. In another example embodiment, the number of users making withdrawals may also be unknown, as in the case of an investment fund, or a family investment portfolio where multiple family members make withdrawals.

Continuing with the example of an investment plan as the target value, in an example embodiment, during the execution of an automated simulation, the target result optimizing application calculates a Profit & Loss table, itemizing the profit and loss of each of the investment instruments within the investment portfolio. For example, if the investment portfolio is a mix of stocks and bonds, the target result optimizing application renders the stock profit, the stock loss, the bond profit, and the bond loss. The target result optimizing application presents this information in both graphical and tabular format. The electronic graphical format is interactive, providing additional information as the user moves a cursor over the graph. In an example embodiment, the target result optimizing application interfaces with financial instruments, for example, the stocks and bonds market, real time, to obtain this data as frequently as desired (i.e., daily, weekly, monthly, etc.).

A method and system for optimizing a target result have been disclosed.

Although embodiments disclosed herein have been described in accordance with the embodiments shown, one of ordinary skill in the art will readily recognize that there could be variations to the embodiments and those variations would be within the spirit and scope of embodiments disclosed herein. Accordingly, many modifications may be made by one of ordinary skill in the art without departing from the spirit and scope of the appended claims.

What is claimed is:

1. A method of optimizing a target result, the method comprising:
receiving, by a client input server, a target result from a user via a real-time interactive display, wherein the target result comprises at least one of a goal, and a statistical probability that the target result is achievable, wherein the target result is to be achieved during a time period beginning at a target result start point, and ending at a target result end point, and wherein the target result is transmitted from the real-time interactive display to the client input server, wherein the target result and goal include stochastic events specified as probability distributions;
automatically interfacing with an online account associated with the user to transmit, from the online account to the client input server, input relevant to the target result;
compiling, by an output server, an interactive strategy to achieve the target result, wherein the interactive strategy comprises a timeline starting at the target result start point, and ending at the target result end point, and wherein the client input server transmits the target result and said input relevant to said target result to the output server;
optimizing, by an optimizer application with an optimizer interface that interfaces with at least one of a client input interface of the client input server and an output interface of the output server, at least a portion of the interactive strategy by:
i) modeling, by a model generator, at least one future performance model associated with the target result, wherein the optimizer application obtains the future performance model from the model generator;
ii) determining an optimal strategy for the target result at the target result end point, wherein the optimal strategy comprises a target result value; and
iii) after determining the optimal strategy, determining at least one second optimal strategy for the target result at a first location in the timeline between the target result end point and the target result start point, using the future performance model, wherein the future performance model provides a performance indicator for the target result at the first location to achieve a sub target result value at the target result end point;
simulating an optimized interactive strategy over the course of the time period, wherein the optimized interactive strategy includes the at least one second optimal strategy and the optimal strategy, starting at the target result start point and ending at the target result end point; and
randomly selecting one of the of the simulated optimized interactive strategies to present to the user on the real-time interactive display; and
rendering the selected simulated optimized interactive strategy, the statistical probability, and the target result for the user on the real-time interactive display, wherein the statistical probability is predictive of achieving the target results, and wherein the selected simulated optimized interactive strategy is transmitted from the output server to the client input server to be rendered on the real-time interactive display.

2. The method of claim 1 further comprising:
receiving an invocation from the user, via the real-time interactive display, to activate the optimized interactive strategy, prior to simulating the optimized interactive strategy.

3. The method of claim 2 wherein simulating the optimized interactive strategy over the course of the time period comprises:
determining a plurality of optimized interactive strategies.

4. The method of claim 2 wherein simulating the optimized interactive strategy over the course of the time period comprises:
incorporating data streamed from a real time online database into at least one of the simulated optimized interactive strategy and a future simulated optimized interactive strategy.

5. The method of claim 2 wherein simulating the optimized interactive strategy over the course of the time period comprises:
determining, during the rendering, that the target result is not achievable; and
iteratively adjusting at least one of a plurality of inputs associated with the target result and simulating the optimized interactive strategy until achieving the target result.

6. The method of claim 2 wherein simulating the optimized interactive strategy over the course of the time period comprises:
determining, during the rendering, that the target result is achievable; and
iteratively adjusting at least one of a plurality of inputs associated with the target result and simulating the optimized interactive strategy until the target result is within an acceptable target result range.

7. The method of claim 2 wherein simulating the optimized interactive strategy over the course of the time period comprises:
determining, during the simulating, that the target result is not achievable; and
determining a highest suboptimal target result that is achievable and a highest statistical probability that the highest suboptimal target result is achievable.

8. The method of claim 2 further comprising:
at least one of:
i) automatically modifying at least one of a plurality of inputs; and
ii) prompting the user to change the at least one of the plurality of inputs; and
re-simulating the optimized interactive strategy over the course of the time period.

9. The method of claim 2 further comprising:
providing the user with at least one interactive control to interact with the simulated optimized interactive strategy during the simulating, via the real-time interactive display.

10. The method of claim 9 further comprising:
obtaining at least one sub target result from the user during the simulating the optimized interactive strategy; and
rendering the simulated optimized interactive strategy with the at least one sub target result incorporated into the optimized interactive strategy.

11. The method of claim 9 further comprising:
obtaining at least one sub target result from the user via the real-time interactive display, wherein the at least one sub target result occurs between the target result start point and the target result end point; and
incorporating the at least one sub target result into the optimized interactive strategy.

12. The method of claim 11 wherein the at least one sub target result comprises at least one of:
i) adding a first asset; and
ii) removing a second asset.

13. The method of claim 1 wherein receiving, by the client input server, the target result from the user via the real-time interactive display comprises:
automatically interfacing with an online account associated with the user to transmit, from the online account to the client input server, input relevant to the target result, wherein the automatically interfacing comprises automatically logging into the online account.

14. The method of claim 1 wherein receiving, by the client input server, the target result from the user via the real-time interactive display comprises:
receiving the goal from the user; and
wherein optimizing, by the optimizer application, comprises:
determining the statistical probability based on the goal inputted by the user.

15. The method of claim 1 wherein optimizing, by the optimizer application, comprises:
at least one of:
i) automatically modifying at least one of a plurality of inputs; and
ii) prompting the user to change the at least one of the plurality of inputs; and
re-optimizing the at least a portion of the interactive strategy.

16. The method of claim 15 wherein the plurality of inputs comprises at least one of:
i) an investment period;
ii) an annuity drawing period;
iii) an initial investment;
iv) an investment maximum;
v) a target annuity; and
vi) a periodic deposit.

17. The method of claim 1 wherein modeling, by the model generator, the future performance model associated with the target result comprises:
modeling the future performance model comprising resources used to achieve the target result, and an allocation of each of the resources in the future performance model.

18. The method of claim 17 wherein modeling the future performance model comprises resources used to achieve the target result, and the allocation of each of the resources in the future performance model comprises:
determining the allocation of each of the resources at any point during the time period to attain a highest probability of achieving the target result.

19. The method of claim 18 further comprising:
providing a recommendation to redistribute the allocation of each of the resources to achieve the target result.

20. The method of claim 1 wherein modeling, by the model generator, the future performance model associated with the target result comprises:
modeling the future performance model using data streamed from a real time online database.

21. The method of claim 1 wherein modeling, by the model generator, the future performance model associated with the target result comprises:
calculating a probability distribution function for the target result at the target result end point.

22. The method of claim 21 wherein calculating the probability distribution function for the target result at the target result end point comprises:
selecting the distribution function target result value from at least two distribution functions based on a risk profile specified by the user in the real-time interactive display.

23. The method of claim 1 wherein modeling, by the model generator, the future performance model associated with the target result comprises:
modeling the future performance model using an example of a past performance.

24. The method of claim 2 wherein after determining the optimal strategy, determining the at least one second optimal strategy comprises:
iteratively determining at least one third optimal strategy for the target result, at a plurality of intervals in the timeline between the first location in the timeline and the target result start point, using the future performance model, wherein the future performance model provides a performance indicator, at each of the plurality of intervals, to achieve the target result value at the target result end point.

25. The method of claim 24 wherein iteratively determining the at least one third optimal strategy for the target result, at the plurality of intervals in the timeline between the first location in the timeline and the target result start point comprises:
utilizing a Monte Carlo simulation to calculate the target result value at the target result end point.

26. The method of claim 24 wherein iteratively determining the at least one third optimal strategy for the target result, at the plurality of intervals in the timeline between the first location in the timeline and the target result start point comprises:
incorporating a previous interval target result value when determining the at least one third optimal strategy for the target result at a current interval, wherein the previous interval target result value is an estimated target result value calculated at a previous interval, wherein the current interval is closer to the target result start point than the previous interval.

27. The method of claim 1 wherein rendering the optimized interactive strategy comprises:
providing the user with a recommendation to achieve the target result.

28. The method claim of claim 1, wherein the goal comprises a withdrawal plan, the withdrawal plan comprising at least partially specified payments during the time period by the user, if requested by the user.

29. The method of claim 1, wherein the target result value comprises, if requested by the user, a withdrawal plan comprising payments during the time period at least partially calculated on behalf of the user.

30. A computer program product for optimizing a target result, the computer program product comprising: a non-transitory computer readable memory device having computer readable program code embodied therewith, the computer readable program code configured to:

receive, by a client input server, a target result from a user via a real-time interactive display, wherein the target result comprises at least one of a goal, and a statistical probability that the target result is achievable, wherein the target result is to be achieved during a time period beginning at a target result start point, and ending at a target result end point, and wherein the target result is transmitted from the real-time interactive display to the client input server, wherein the target result and goal include stochastic events specified as probability distributions wherein the goal comprises a withdrawal plan, the withdrawal plan comprising one of at least partially specified payments during the time period by the user, if requested by the user;

automatically interfacing with an online account associated with the user to transmit, from the online account to the client input server, input relevant to the target result;

compile, by an output server, an interactive strategy to achieve the target result, wherein the interactive strategy comprises a timeline starting at the target result start point, and ending at the target result end point, and wherein the client input server transmits the target result and the input relevant to the target result to the output server, optimize, by an optimizer application with an optimizer interface that interfaces with at least one of a client input interface of the client input server and an output interface of the output server, at least a portion of the interactive strategy by:

i) modeling, by a model generator, at least one future performance model associated with the target result, wherein the optimizer application obtains the future performance model from the model generator;

ii) determining an optimal strategy for the target result at the target result end point, wherein the optimal strategy comprises a target result value; and iii) after determining the optimal strategy, determining at least one second optimal strategy for the target result at a first location in the timeline between the target result end point and the target result start point, using the future performance model, wherein the future performance model provides a performance indicator for the target result at the first location to achieve a sub target result value at the target result end point;

simulating an optimized interactive strategy over the course of the time period, wherein the optimized interactive strategy includes the at least one second optimal strategy and the optimal strategy, starting at the target result start point and ending at the target result end point; and randomly selecting one of the of the simulated optimized interactive strategies to present to the user on the real-time interactive display; and render the selected simulated optimized interactive strategy, the statistical probability, and the target result for the user on the real-time interactive display, wherein the statistical probability is predictive of achieving the target results, and wherein the selected simulated optimized interactive strategy is transmitted from the output server to the client input server to be rendered on the real-time interactive display.

31. The computer program product of claim 30, wherein the target result value comprises, if requested by the user, a withdrawal plan comprising payments during the time period at least partially calculated on behalf of the user.

32. A system comprising: a processor; and a non-transitory computer readable memory device, having computer readable program code embodied therewith, the computer readable program code configured to:

receive a target result from a user, wherein the target result comprises at least one of a goal, and a statistical probability that the target result is achievable, wherein the target result is to be achieved during a time period beginning at a target result start point, and ending at a target result end point, wherein the target result and goal include stochastic events specified as probability distributions, wherein the goal comprises a withdrawal plan, the withdrawal plan comprising at least partially specified payments during the time period by the user, if requested by the user;

automatically interfacing with an online account associated with the user to transmit, from the online account to the client input server, input relevant to the target result;

compile by an output server an interactive strategy to achieve the target result, wherein the interactive strategy comprises a timeline starting at the target result start point, and ending at the target result end point and wherein the client input server transmits the target result and the input relevant to the target result to the output server;

optimize, by an optimizer application resident at the output server, at least a portion of the interactive strategy by:

i) modeling, by a model generator, at least one future performance model associated with the target result, wherein the optimizer application obtains the future performance model from the model generator;

ii) determining an optimal strategy for the target result at the target result end point, wherein the optimal strategy comprises a target result value; and iii) after determining the optimal strategy, determining at least one second optimal strategy for the target result at a first location in the timeline between the target result end point and the target result start point, using the future performance model, wherein the future performance model provides a performance indicator for the target result at the first location to achieve a sub target result value at the target result end point;

simulating an optimized interactive strategy over the course of the time period, wherein the optimized interactive strategy includes the at least one second optimal strategy and the optimal strategy, starting at the target result start point and ending at the target result end point; and randomly selecting one of the of the simulated optimized interactive strategies to present to the user on the real-time interactive display; and render the selected simulated optimized interactive strategy, the statistical probability, and the target result for the user, wherein the statistical probability is predictive of achieving the target results;

detect at least one of:
- i) automatic modification of at least one of a plurality of inputs; and
- ii) user modification of the at least one of the plurality of inputs; and re-optimizing the at least a portion of the interactive strategy.

33. The system of claim 32, wherein the target result value comprises, if requested by the user, a withdrawal plan comprising payments during the time period at least partially calculated on behalf of the user.

* * * * *